(12) United States Patent
Bashford (10) Patent No.: US 6,586,679 B2
(45) Date of Patent: Jul. 1, 2003

(54) ELECTRICAL JUNCTION BOX FOR CONSTRUCTION PANELS

(76) Inventor: Howard H. Bashford, 511 E. Warner Rd., Tempe, AZ (US) 85284

( * ) Notice: Subject to any disclaimer, the term of this patent is extended or adjusted under 35 U.S.C. 154(b) by 0 days.

(21) Appl. No.: 09/974,553

(22) Filed: Jan. 25, 2002

(65) Prior Publication Data

US 2002/0066581 A1 Jun. 6, 2002

Related U.S. Application Data

(63) Continuation of application No. 09/416,376, filed on Oct. 12, 1999, now abandoned.

(51) Int. Cl.[7] ................................................. H01H 9/02
(52) U.S. Cl. ............................ 174/58; 179/63; 248/906; 439/535; 220/4.02
(58) Field of Search .............................. 174/50, 53, 58, 174/63, 66; 220/3.2, 3.3, 4.02, 3.8, 3.4, 241, 3.6, 3.5, 3.9; 439/535, 650; 248/906; 361/641; 33/528, DIG. 10; D8/352

(56) References Cited

U.S. PATENT DOCUMENTS

| | | | | |
|---|---|---|---|---|
| 4,892,212 A | * | 1/1990 | Andreyko | 174/58 X |
| 6,369,327 B1 | * | 4/2002 | Fierro | 174/58 |
| 6,388,192 B1 | * | 5/2002 | Layne | 220/4.02 |

* cited by examiner

Primary Examiner—Dean A. Reichard
Assistant Examiner—Dhiru R Patel
(74) Attorney, Agent, or Firm—Scott C. Krieger (57) ABSTRACT

Embodiments of the present invention relate to electrical junction boxes with mounting flanges configured for use with construction panels.

4 Claims, 6 Drawing Sheets

ELECTRICAL JUNCTION BOX FOR CONSTRUCTION PANELS

CROSS REFERENCE TO RELATED APPLICATIONS

This application is a continuation of application Ser. No. 09/416,376, filed Oct. 12, 1999 now abandoned, entitled "Electrical Junction Box for Construction Panels," invented by Howard H. Bashford.

BACKGROUND OF THE INVENTION

1. The Field of the Invention

The present invention relates to electrical junction boxes as used for the connection of conductors and the mounting of electrical receptacles and fixtures. In particular, the present invention relates to electrical boxes used in conjunction with construction panels such as structural insulated panels (SIP's) which have an exterior layer of plywood or similar material and an interior layer of foam and insulated concrete panels (ICP's) which have outer layers of rigid insulation and an inner layer of concrete. The electrical junction boxes of the present invention are particularly suited for mounting in a round hole drilled in the surface layer of such panels.

2. The Relevant Technology

Electrical junction boxes are commonly used in the construction industry for the connection and termination of electrical conductors and for the mounting of electrical receptacles, fixtures, and other apparatus. They are used in both residential and commercial buildings though their features may vary for different applications. In a typical installation, electrical boxes are placed in the wall, floor or ceiling of a structure by fixing them to the structural members. In a wood-frame residential building, electrical boxes are generally equipped with flanges or holes for receiving nails or screws with which they are fixed to framing members. These boxes are typically nailed or screwed to a wall stud, floor joist, ceiling joist or rafter in a position that will allow access to the box through the finished surface of the wall, ceiling or floor.

Once the typical electrical box is attached to the framing member, a surface finish material is attached to the framing to provide a finish surface to the building or room. For walls, common finish materials include drywall or sheetrock, stucco, masonry units, and wood, aluminum or vinyl siding. Electrical boxes are typically mounted in a manner that aligns one side of the box with the outer finished surface of the wall, floor or ceiling. The electrical box generally protrudes through the wall covering material so as to be flush with the outer finished surface of the wall. Mounting in this manner allows access to the box once the finished surface is complete and allows for mounting of electrical receptacles and fixtures directly to the box.

Structural insulated panels (SIP's) typically comprise two exterior layers separated by an interior layer of foam insulation. The exterior layers are generally composed of plywood, oriented-strand board or a similar material. The interior layer is generally composed of a substantially rigid insulation material such as expanded polystyrene or polyurethane.

In many SIP's electrical wiring is routed through electrical chases that are formed in the interior foam layer. Chases may be molded, drilled, routed or otherwise formed in the foam layer. In order to utilize these chases, an electrical box must be mounted in the SIP at a location that will intersect a chase. Currently, this mounting is performed by drilling a small hole in the exterior layer of the SIP sufficiently large to accept the blade of a saw. A saw is then used to cut a hole in the exterior layer of the SIP, the hole being shaped to conform to the shape of the electrical box. The box is then mounted in the hole and fastened to the exterior layer of the SIP with screws. When mounting, the installer must mount the box in a position that allows the box to protrude outwardly from the surface of the SIP to allow for the thickness of the wall covering material that will be applied to the wall. This process involves many steps and tools and generally results in a poorly secured and inaccurately placed box.

Insulated concrete panels (ICP's) are another type of construction panel. ICP's have an inner layer or core composed of concrete and exterior layers on either side of the concrete core which are composed of rigid insulation. ICP's may be pre-cast with their exterior insulation layers so that they may be used in a tilt-up style construction or they may be fabricated on-site using forms composed of rigid insulation into which concrete is placed onsite. Both methods of construction yield panels with exterior insulation layers over a concrete core. Wiring may be run through ICP's by creating electrical chases in the exterior insulation layers. This may be achieved by pre-molding the layers or by cutting or routing chases into the rigid insulation after panel assembly. Regardless of the methods used, electrical receptacles and connections of electrical wires must occur at electrical box locations. Presently these boxes are installed by cutting away the insulation layer where the box is to be located and gluing the box to the exposed layers. Preparing the hole for standard electrical boxes can involve several tools and multiple cutting and scraping operations.

Construction panels comprise structural insulated panels (ICP's) as well as insulated concrete panels (ICP's) and other panels or construction components with layered construction materials.

SUMMARY AND OBJECTS OF THE INVENTION

The present invention relates to an electrical junction box with a specialized mounting flange that allows the box to be mounted in a round hole drilled in a construction panel. The body of the electrical box may have the standard dimensions, shape, mounting holes and hardware of typical electrical boxes, however the electrical box of the present invention comprises a mounting flange that is designed to cover and mount to a round hole drilled in a construction panel.

Embodiments of the present invention may be mounted to the exterior layer of a construction panel with screws, nails, adhesive or other conventional fasteners. Some embodiments may also be attached with specialized clips which engage the exterior layer of a SIP thereby locking the box to the SIP.

Some embodiments of the present invention may also have mounting lugs which engage the inner edge of a hole drilled in the exterior layer of a SIP to stabilize the box and prevent rotation of the box in the mounting hole.

The mounting flange of some embodiments of the present invention may have a thickness that is roughly equal to the thickness of the wall covering material that will be applied to the wall in which the box will be mounted. After the box is mounted, the wall covering can be installed right up to the edge of the box forming a flush surface with the mounting flange. Some embodiments of the mounting flange may have a textured surface or be constructed of a compatible material such that they can be finished in the same manner as the wall covering material. For example, and not by way of limitation, the mounting flange may have a textured or drilled surface appropriate for receiving drywall joint compound. When drywall is applied to the wall it is installed flush with the mounting flange so that a typical drywall joint may be formed between the drywall and the mounting flange thereby concealing the mounting flange from view.

Other embodiments of the present invention comprise a thin mounting flange which may be covered by finish materials and concealed thereunder.

Accordingly, it is an object of some embodiments of the present invention to provide an electrical box that can be mounted in a round hole.

It is also an object of some embodiments of the present invention to provide an electrical box that can be mounted without fastening to framing members.

It is another object of some embodiments of the present invention to provide an electrical box that can be mounted in a construction panel prepared solely by drilling a hole.

These and other objects and features of the present invention will become more fully apparent from the following, description and appended claims, or may be learned by the practice of the invention as set forth hereinafter.

BRIEF DESCRIPTION OF THE DRAWINGS

In order that the manner in which the above-recited and other advantages and objects of the invention are obtained, a more particular description of the invention briefly described above will be rendered by reference to a specific embodiment thereof which is illustrated in the appended drawings. Understanding that these drawings depict only a typical embodiment of the invention and are not therefore to be considered to be limiting of its scope, the invention will be described and explained with additional specificity and detail through the use of the accompanying drawings in which.

DETAILED DESCRIPTION OF THE PREFERRED EMBODIMENTS

The figures listed above are expressly incorporated as part of this detailed description. It will be readily understood that the components of the present invention, as generally described and illustrated in the Figures herein, could be arranged and designed in a wide variety of different configurations. Thus, the following more detailed description of the embodiments of the system and apparatus of the present invention, as represented in FIGS. 1 through 6, is not intended to limit the scope of the invention, as claimed, but it is merely representative of the presently preferred embodiments of the invention.

Figure 1A:
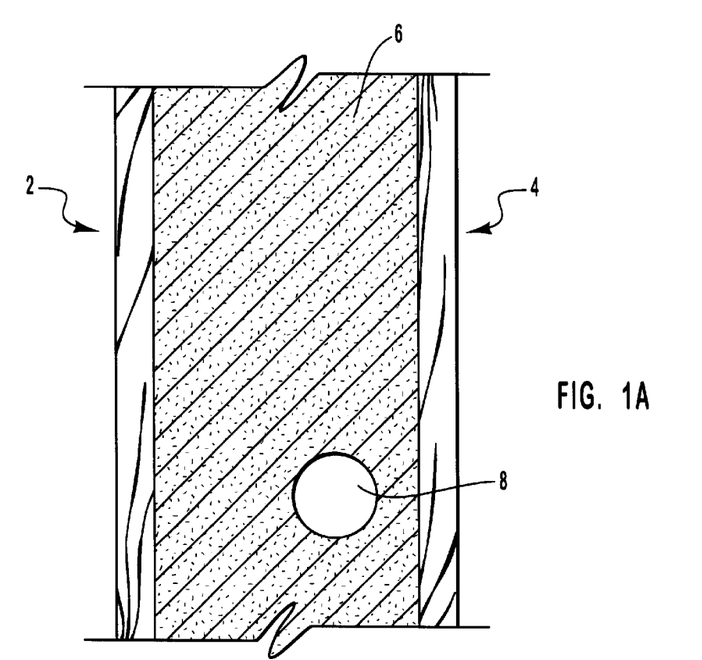
FIG. 1A is a cross-sectional view of a typical SIP.

The currently preferred embodiments of the present invention will be best understood by reference to the drawings, wherein like parts are designated by like numerals throughout. In reference to FIG. 1, a typical structural insulated panel (SIP) is shown with two exterior shell layers 2 & 4 on either side of an inner insulation layer 6. Exterior shell layers 2 & 4 are typically composed of plywood or oriented-strand board (OSB) or a similar pressed wood product. Inner insulation layer 6 is generally constructed of a rigid foam material that provides both excellent insulation properties and structural rigidity. Areas within insulation layer 6 may be omitted, or removed to provide chases, such as electrical chase 8, which allows for placement of electrical wiring in the SIP.

Figure 1B:
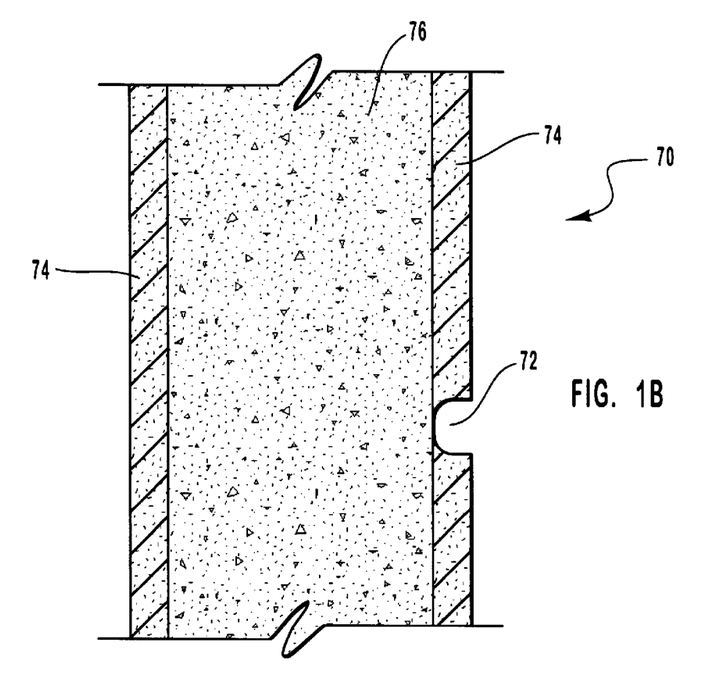
FIG. 1B is a cross-sectional view of a typical ICP.

Insulated concrete panels (ICP's) 70 have a concrete core or interior layer 76 with exterior layers 74 composed of rigid insulation material. Electrical wiring may be placed in ICP's within the exterior insulation layers 74 by placing electrical chases 72 therein. SIP's, ICP's and similar layered construction panels may be referred to by the term "construction panel." The term "construction panel" shall encompass all such panels as used in this document.

Figure 2:
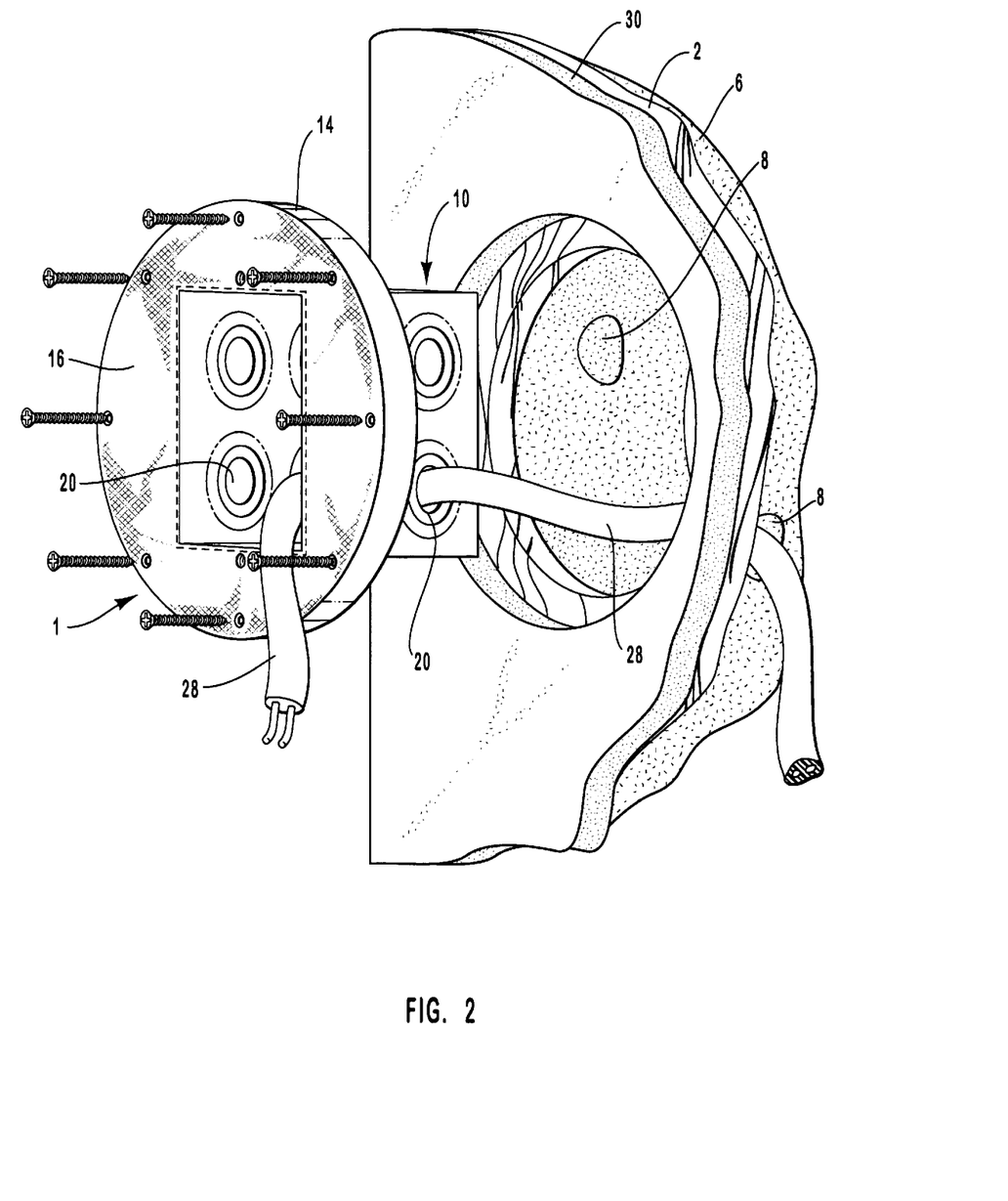
FIG. 2 is a perspective view of an embodiment of the present invention with a thickened flange.

Some embodiments of the present invention, as depicted in FIG. 2, comprise a box 10 attached to a mounting flange 14. Box 10 may be attached to flange 14 with conventional fasteners, bonded thereto, molded as a unit therewith or otherwise attached. Mounting flange 14 comprises a face 16 which may be treated to match a specific wall covering material or receive a specific finish treatment.

Figure 3A:
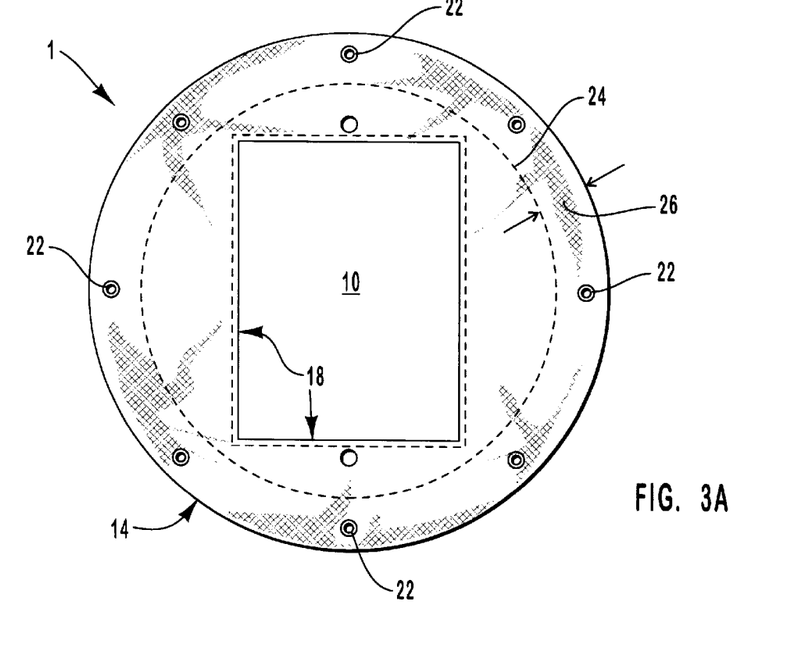
FIG. 3A is a front view of the embodiment of the present invention shown in FIG. 2.
Figure 3B:
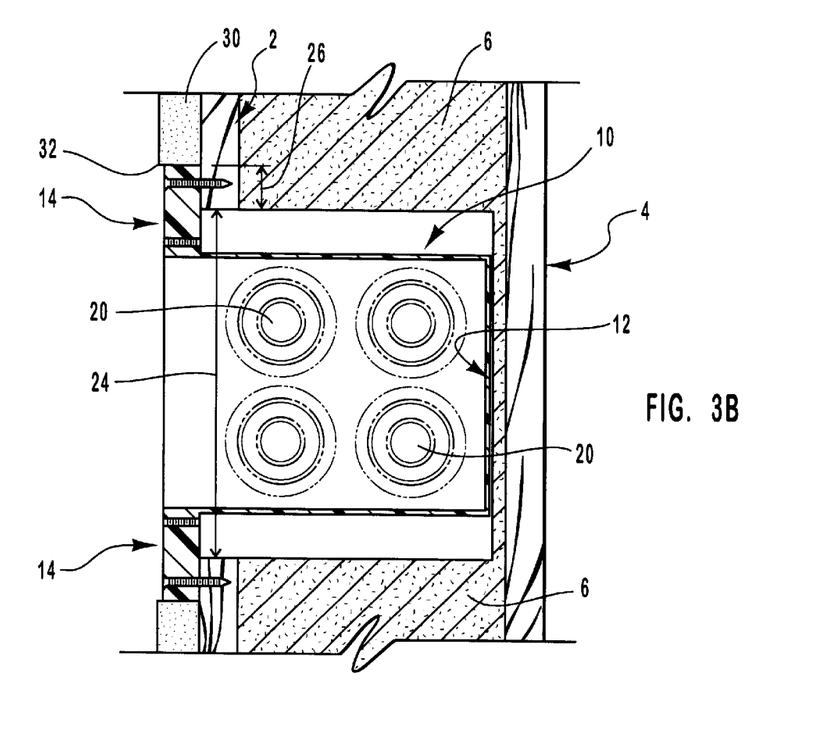
FIG. 3B is a cross-sectional view of the embodiment of the present invention shown in FIG. 2.

A first embodiment of the present invention, as shown in FIGS. 3A & 3B, comprises box body 10 which may have multiple sides forming a rectangular box or may have a cylindrical shape such as a circular or octagonal cylinder with side walls 18 and an end wall 12 all of which are standard shapes for common electrical boxes used in the industry. Other box shapes are contemplated to be within the scope of the present invention.

This first embodiment further comprises a mounting flange 14 rigidly attached to said box 10 such that box 10 may be securely attached to a construction panel with mounting flange 14. In this embodiment of the present invention, mounting flange 14 comprises mounting holes 22 through which mounting flange 14 may be attached to exterior construction panel layer 2 with screws, nails or other conventional fasteners. Flange 14 may also be attached to a construction panel layer using adhesive or other bonding methods without using holes 22. The process by which electrical box 1 is mounted to a SIP includes drilling or otherwise forming a mounting hole 24 in exterior layer 2 of a SIP. Mounting hole 24 should be sized to accommodate box 10 but be smaller than flange 14 so that flange 14 may overlap layer 2 by an amount sufficient to support flange 14 and allow mounting fasteners placed in holes 22 or elsewhere on flange 14 to properly engage layer 2. In a preferred embodiment of the present invention comprising a box 10 sized for a single gang receptacle or switch, mounting hole 24 has a diameter of around 4 inches. In this single gang embodiment mounting flange 14 has a diameter of 5 inches thereby providing an overlap 26 of ½" around the circumference of the hole 24.

Hole 24 may be drilled into inner insulation layer 6 to a sufficient depth to accommodate box or portions of layer 6 may be removed using other tools. Hole 24 is typically located over chase 8 through which wiring may be routed. Knockouts 20 or other wire access apertures may be formed in the sides of box 10 to allow wiring to enter box 10 for connection to receptacles and other wires therein. Once hole 24 has been created to a sufficient depth into layer 6, wiring 28 may be pulled into box 10 for access and connection. Construction panel junction box 1 may then be mounted in hole 24 and fastened to exterior layer 2 of a SIP using conventional fasteners, the mounting clips of the present invention or other means between flange 14 and layer 2.

After flange 14 has been adequately secured to layer 2, wall covering material 30 may be attached to layer 2 to form a finished wall surface. Wall covering material may vary widely for interior and exterior walls, floors and ceilings. Typical materials include, by way of example and not limitation, plaster, drywall, stucco, fiber-reinforced plastic (FRP), brick and masonry units, ceramic and stone tiles, and various wood treatments. Of these materials, the most commonly used for walls and ceilings is drywall or gypsum board which is generally available in sheets having a thickness of ½" or ⅝".

Flange 14 may be manufactured with various decorative trim treatments such as polished wood, chrome or brass, however a preferred embodiment creates a less obtrusive look by blending into the surface of a drywall finish. In this preferred embodiment, flange 14 has a thickness nominally equal to that of the drywall and face 16 is textured, paper-faced or otherwise treated to receive drywall joint compound so that the joint 32 between flange 14 and drywall wall covering 30 may be taped and finished as other drywall joints on the same wall leaving no visible trace of joint 32.

Figure 4A:
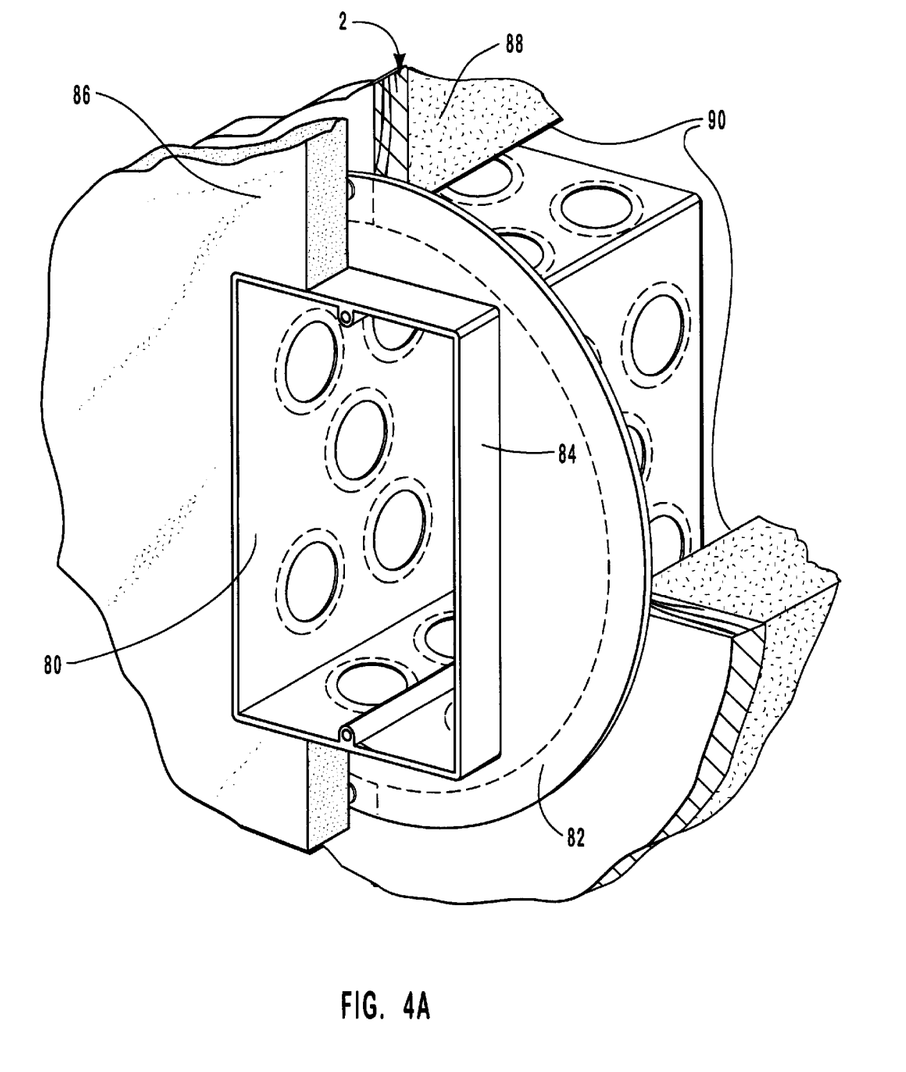
FIG. 4A is a perspective view of an embodiment of the present invention with a thin flange.
Figure 4B:
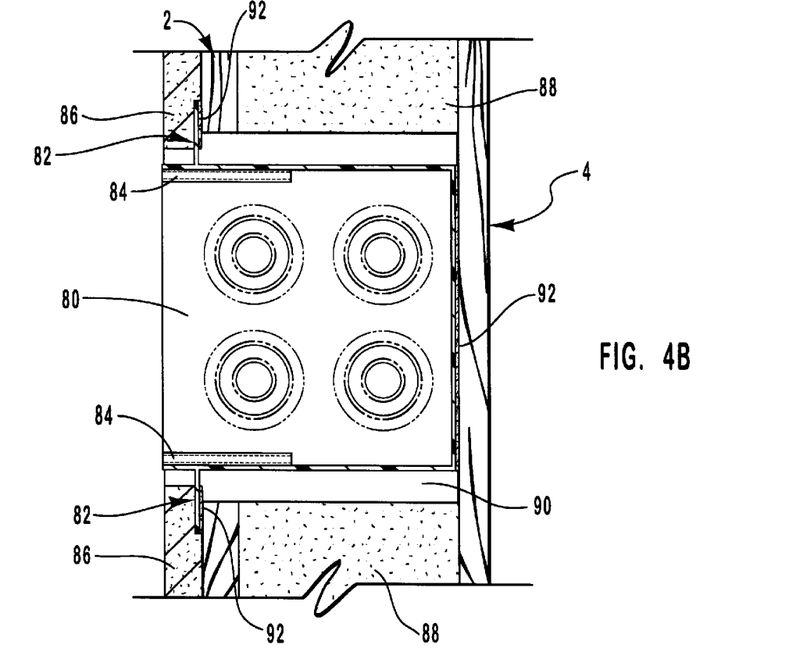
FIG. 4B is a cross-sectional view of the embodiment of the present invention shown in FIG. 4A.

An alternative, thin-flanged embodiment of the present invention is shown in FIGS. 4A and 4B. In this embodiment, box 80 is rigidly attached to mounting flange 82 which is sufficiently thin to be unobtrusive when placed below most finish materials. Thin mounting flange 82 may be composed of sheet metal, plastic or other materials known in the art and may be attached to box 80 by fasteners, bonding or it may be molded therewith to form a unitary article. A box protrusion 84 projects outward from flange 82 so that it may protrude through the finish materials 86 to be placed on exterior panel layer 88.

This embodiment of the present invention may be mounted by drilling a round hole 90 in a SIP or an ICP, as shown in FIGS. 4A and 4B. Once hole 90 has been drilled at a location which intersects an electrical chase, wiring may be routed through the chase and into box 80. Box 80 may then be attached to panel layer 88 using adhesive 92 or conventional fasteners as needed. Once finish materials 86 have been applied to panel layer 88, flange 82 will be further fixed by the overlap of finish material 86 over flange 82. Finish material overlap will also conceal flange 82 so that it will not be visible after wall finish.

Figure 5:
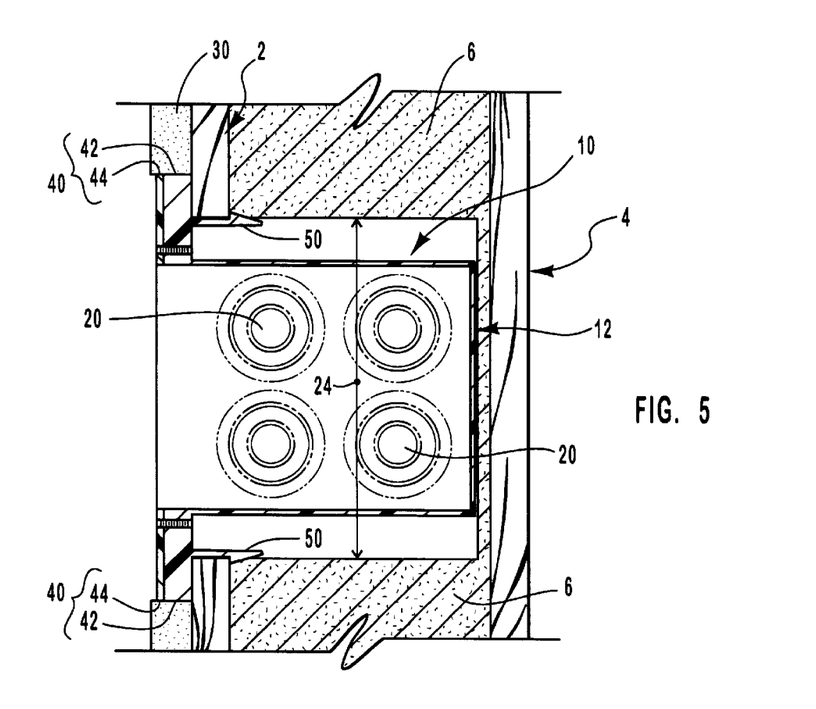
FIG. 5 is a cross-sectional view of an alternative embodiment of the present invention comprising mounting clips.

Alternative embodiments of the present invention, as shown in FIG. 5, comprise a multi-piece flange 40 comprising a base flange 42 rigidly attached to box 10 and securable to layer in similar fashion to flange 14, however multi-piece flange 40 comprises an additional face plate 44 which may be fastened, adhered, bonded or otherwise attached to base flange 42. Face plate 44 may serve as a finished element with decorative features or may be composed of materials such as drywall which can be finished into the wall surface. Face plate 44 may also be used as a spacer to adjust the thickness of base flange 42 to a specific wall covering material thickness. For example, and not by way of limitation, face plate 44 may be used to increase base flange thickness from ½" to ⅝" to accommodate fire-resistant drywall.

Figure 6:
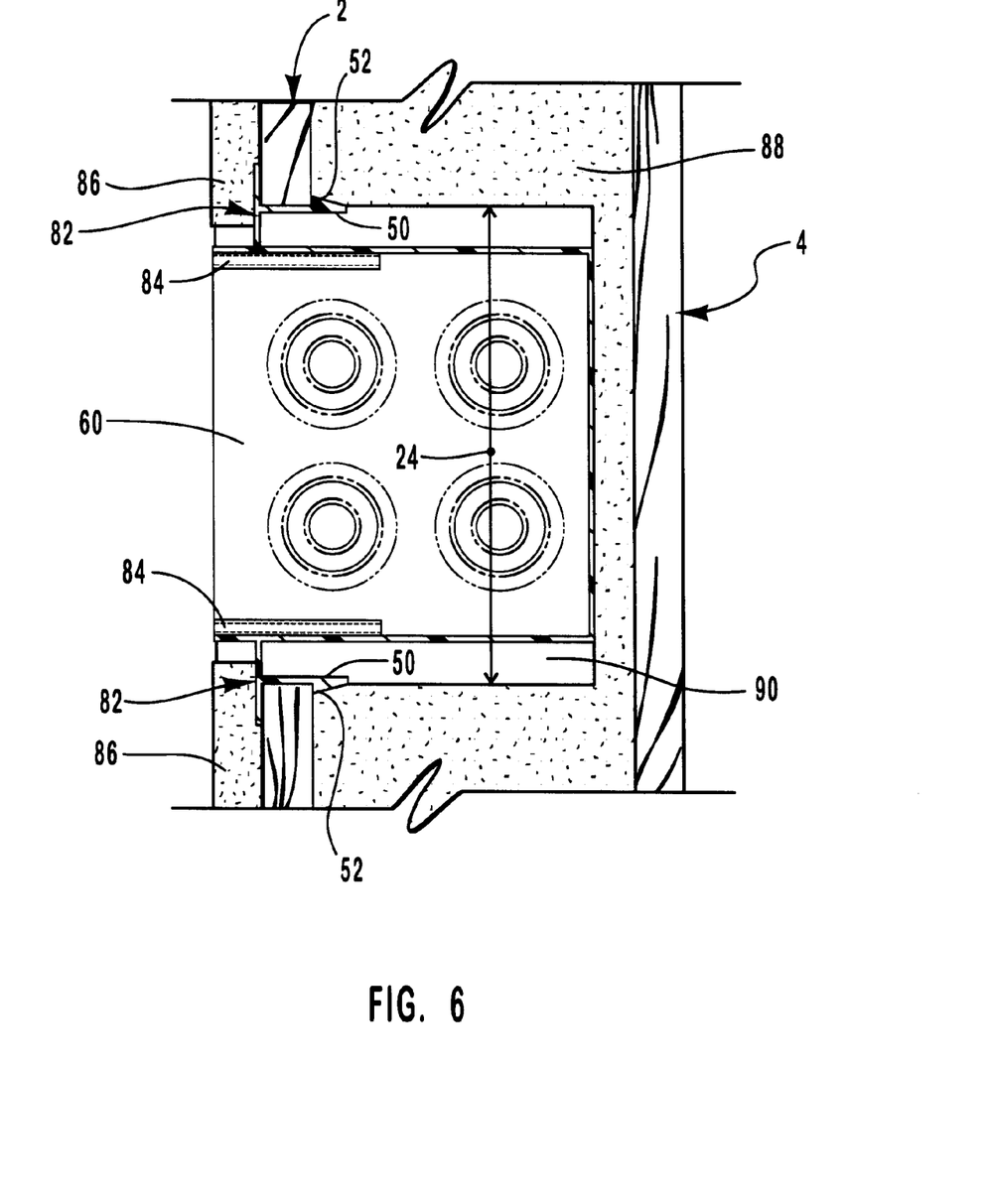
FIG. 6 is a cross-sectional view of an alternative embodiment of the present invention comprising a face plate.

The ease of installation of embodiments of the present invention may be further enhanced with mounting clips 50, as shown in FIGS. 5 and 6. Mounting clips 50 may protrude from flange 14 or 42 at any interval along the circumference of a standard-sized mounting hole 24. Mounting clips 50 are configured to engage exterior layer 2 of a SIP or exterior layer 88 of an ICP such that box of the present invention is securely attached thereto. In a preferred embodiment, clips 50 will engage layer 2 of a SIP so as to prevent substantial movement of box unit 60 relative to layer 2 and prevent rotation in hole 24. Once wires 28 have been pulled through knockout 20 box unit 60, as shown in FIG. 6, may be inserted into hole 24 wherein clips 50 will elastically deform until full insertion of box unit 60 in hole 24 at which point clips 50 will snap behind layer 2 of the SIP thereby engaging layer 2 and locking box unit 60 into position. When used in conjunction with ICP's clips 50 are configured to engage within exterior insulation layer 88. Clips 50 may have prongs 52 shaped to engage various materials used in construction panel layers. When clips 50 are used the present invention is afforded a simple snap fit Mounting clips 50 may be configured to selectively engage layer 2 or 88 in order to facilitate removal of box unit 60 if necessary. This selective engagement may be achieved with tabs accessible through the interior of box 10 or some other means.

The present invention may be embodied in other specific forms without departing from its spirit or essential characteristics. The described embodiments are to be considered in all respects only as illustrated and not restrictive. The scope of the invention is, therefore, indicated by the appended claims rather than by the foregoing description. All changes which come within the meaning and range of equivalency of the claims are to be embraced within their scope.

I claim:

1. An electrical junction box apparatus configured to mount in a round hole in a construction panel, said junction box apparatus comprising:

a box for receiving and connecting electrical conductors;

a mounting flange connected to said box, said flange allowing attachment of said box to an exterior layer of a construction panel when said exterior layer has a round hole therein of sufficient size to accommodate said box said flange having a thickness substantially equal to that of finish materials; and a box protrusion protruding from said flange, said protrusion configured to project through finish materials so as to provide access through said finish materials and to provide mounting structure for electrical receptacles.

2. The apparatus of claim 1 wherein said flange is comprised of multiple flange layers with an exterior flange layer that may be matched to a particular one of said finish materials and an interior flange lager for secure mounting of said box to said panel.

3. The apparatus of claim 1 wherein said flange is comprised of multiple flange layers with an exterior flange layer that acts as ornamental trim.

4. An electrical junction box for mounting in a round hole in a construction panel, said junction box comprising:

a box for receiving and connecting electrical conductors;

a mounting flange connected to said box, said flange allowing attachment of said box to an exterior layer of a construction panel around the periphery of a round hole in said construction panel; and mounting clips on said flange which are shaped to extend through the thickness of said exterior layer of said construction panel and engage an interior edge of said exterior layer around the periphery of said round hole.

* * * * *